July 2, 1957  F. P. PASSEMAR  2,797,458
PROCESS FOR FORMING METALLIC MOULDS
Filed June 7, 1955  6 Sheets-Sheet 1
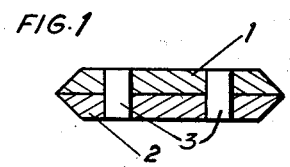
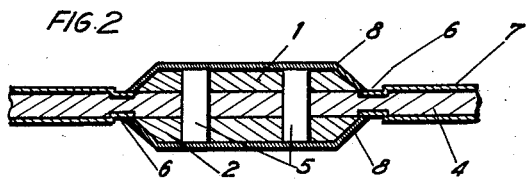
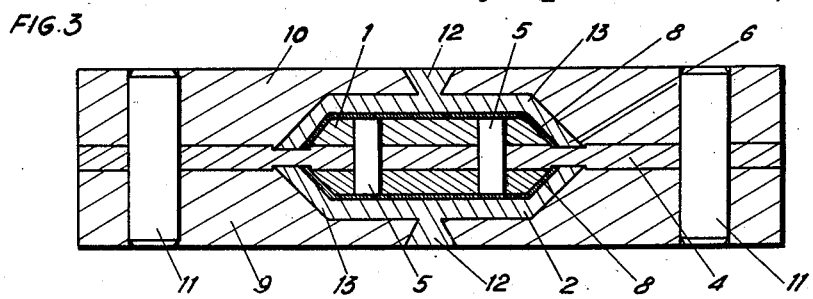
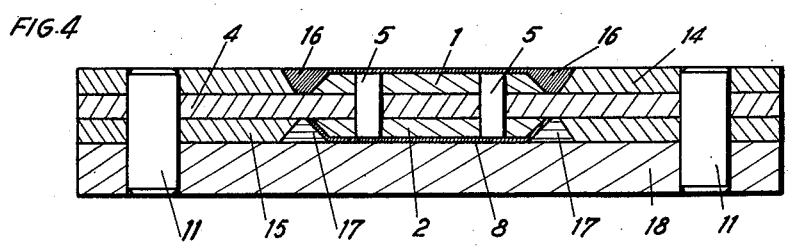
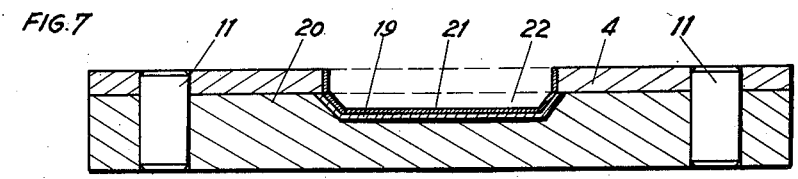
INVENTOR
FELIX P. PASSEMAR

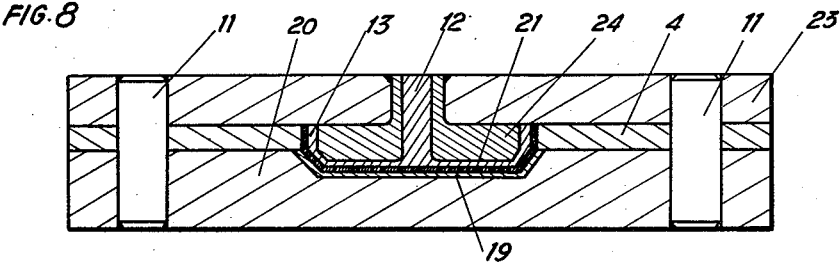
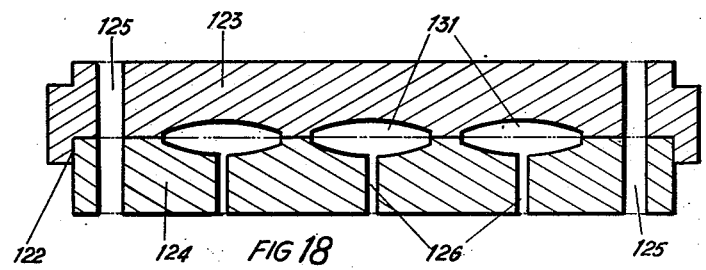
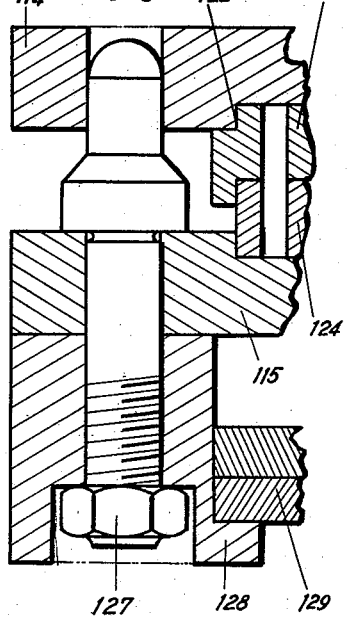
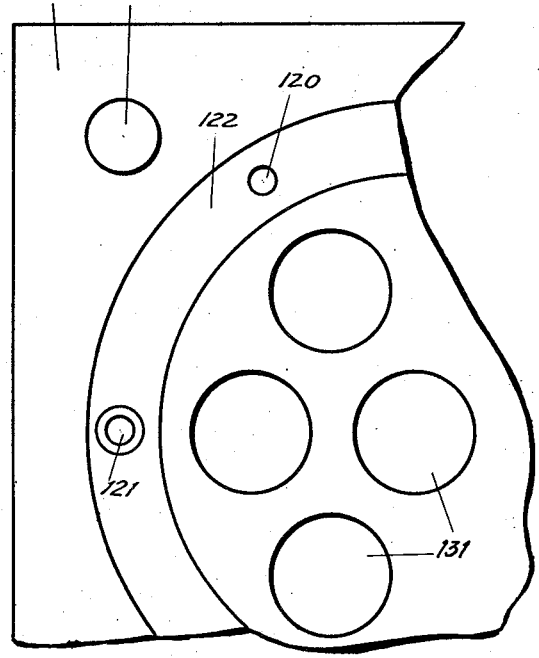

INVENTOR
FELIX P. PASSEMAR

July 2, 1957  F. P. PASSEMAR  2,797,458
PROCESS FOR FORMING METALLIC MOULDS
Filed June 7, 1955  6 Sheets-Sheet 4
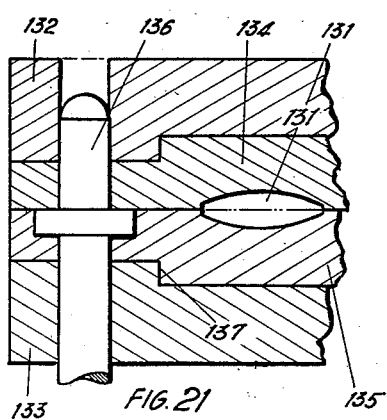
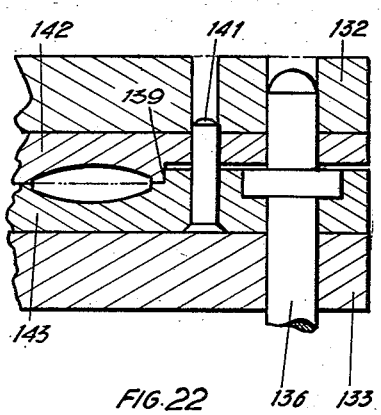
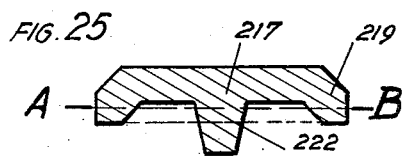
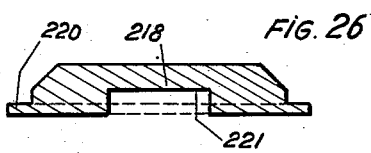
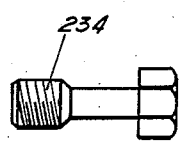
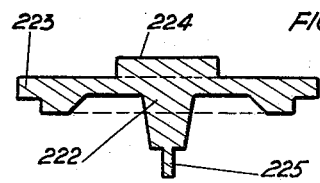

July 2, 1957   F. P. PASSEMAR   2,797,458
PROCESS FOR FORMING METALLIC MOULDS
Filed June 7, 1955   6 Sheets-Sheet 5
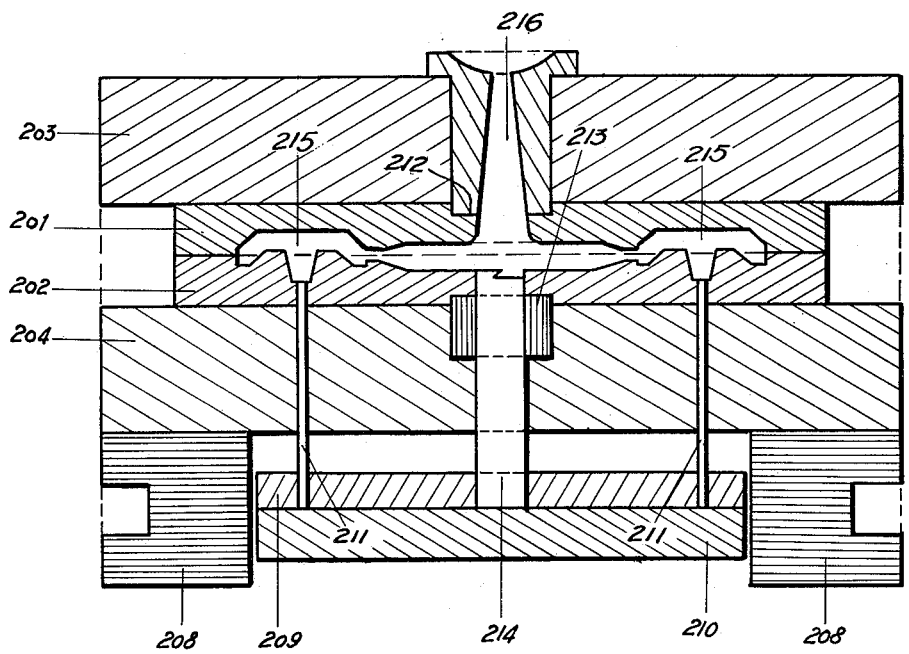
FIG. 24
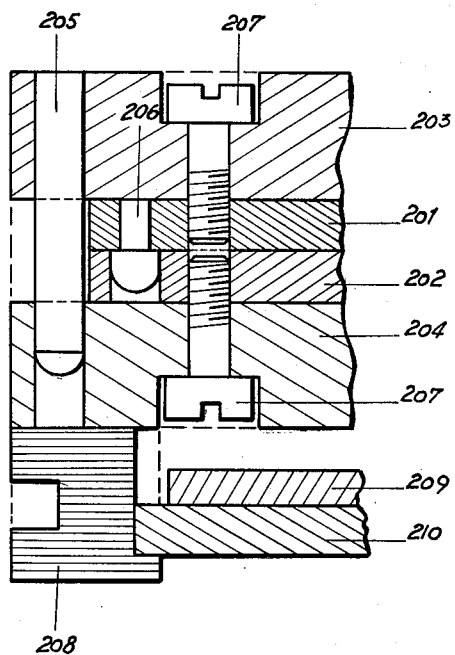
FIG. 23
INVENTOR
FELIX P. PASSEMAR
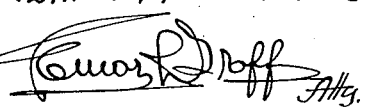

INVENTOR
FELIX P. PASSEMAR

United States Patent Office 2,797,458
Patented July 2, 1957

2,797,458

PROCESS FOR FORMING METALLIC MOULDS

Felix Pierre Passemar, Colombes, France

Application June 7, 1955, Serial No. 513,700

Claims priority, application France June 28, 1954

2 Claims. (Cl. 22—193)

The object of the present invention is a new process for obtaining metallic moulds for use in apparatus of the injection type.

It is well known that an impression or shape of a piece to be reproduced can be obtained by means of a metallic deposit. Such impression serves then as a mould.

The new process aims to obtain moulds which are strong and accurate from impressions obtained by covering a pattern with a metallic coating, such process showing an undoubted advantage over the usual method resorted to when establishing moulds with one or more patterns.

In order to obtain the metallic impressions to be secured into the mould, no claim is made as to the method by which the coating is applied over the pattern: a pulverizing, a galvanoplastic, an electroplastic or any other method may be resorted to.

The main object of the present invention is to fix firmly and with utmost precision the patterns which have to mould the castings, by use of plates or flanged bands which functions as supports and guides.

Various embodiments for carrying out the process are described hereafter, by way of examples, with reference to the annexed drawings, in which:

Fig. 1 is a section through the complementary pattern sections;

Fig. 2 is a partial view of a section through a standard pattern carrying plate;

Fig. 3 is a section through a finished mould flask;

Fig. 4 is a section through a mould showing alternative ways of construction;

Fig. 5 is a section through a finished piece to be obtained;

Fig. 6 is a section through a finished mold element deposited in its form;

Fig. 7 is a section through an assembly for making a movable half die;

Fig. 8 is a section through a finished mould;

Figs. 17, 18, 19, 20, 21 and 22 are simplified views showing by what means the flanged plates can be made removable and interchangeable;

Figs. 23 and 24 are sections referring to the casting outfit;

Fig. 25 is a section through a piece to be reproduced;

Figs. 26 and 27 are sections through pattern-halves;

Fig. 28 is a view of a detail;

Fig. 30 is a section through two flanged bands with their respective half-patterns before any metal has been run in.

Fig. 1 shows a section of a pattern used for repetitive castings built up in two sections, 1 and 2, detachably secured together by pins 3.

Figure 17:
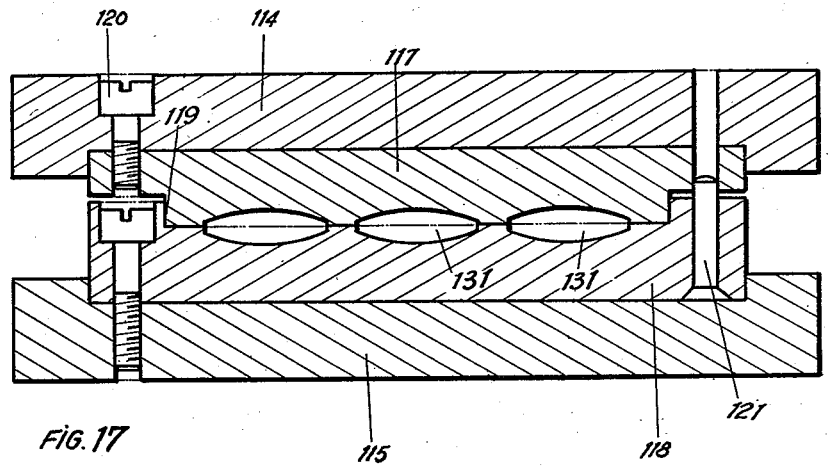

Fig. 3 shows the method used to correctly and accurately assemble the pattern sections 1 and 2 at opposite sides of a pattern plate 4 which is standard or common to all operations making a given mould element. The pattern sections 1 and 2 are accurately located in their exact respective positions by pins 5 passing there through and also passing through the medial portion of pattern plate 4.

As shown in Figs. 2 and 3, the pattern plate 4 is provided with a depression or groove 6 disposed about the outer edge portions of the pattern sections 1 and 2 and covered and protected by a metallized insulating material 7. This coating of insulating material is applied to the plate before applying the metallic coating to the pattern sections which will form the mould element 8. The coating is intended to prevent adherence of the edges of the mould element 8 to the pattern plate.

Once the mould elements 8 have been made, the method then proceeds according to Fig. 3 so as to obtain accurate registration of the half mould portions in the cope and the drag. Heretofore, this operation has generally been lengthy and delicate but may now be obtained with great facility in the present method.

That is to say, after the step shown in Fig. 2, the insulation covering 7 on the pattern plate is removed and the said plate is then inserted between the drag 9 and the cope 10 where it becomes an intermediate member of the flask. With the aid of pins 11, the entire assembly can then be perfectly adjusted. Drag 9 and cope 10 are so arranged as to leave free spaces or cavities slightly in excess of what is required by the mould elements 8—8. These cavities are provided with feed inlets 12 through which fused metal 13 can be forced under pressure.

In order to compensate any shrinking of the injected metal, a minimum clearance must be left and the whole of the mould will have to be heated up so that its proper shrinking wil secure the injected metal.

All this being done, the mould is dismounted, the standard plate 4 is removed and the half-patterns 1 and 2 taken off, after which one proceeds to the finishing of the mould.

Should the impression not stand any finishing and in case the mould should require a stripping device, the half-pattern has to be provided with a rod made of a soft metal having its free end insulated. Said rod will be drilled out in due course and the holes thus formed will allow the passage of a drawing-off rod.

Fig. 4 shows, by way of example, other means for using a standard pattern plate 4. The first alternative way refers to the direct fixing of the mould element 8 which will then form a single mass with cope 14 without any metallic binder between them.

The pattern 4 with its uncovered half-pattern 1 is connected with cope 14 through 11—11. The clearance between the uncovered half-pattern and the plate hole must be filled-up with a hard and non-oxidising metal 16, for instance by way of anodic pulverizing under vacuum. In such a way, the mold elements obtained are very hard, and become in effect integral with cope 14.

Use is then made of a plate supporting the cope which completes that part of the mould.

Another embodiment consists in fixing plate 4 with its half-pattern 2 recovered by mould element 8 into a drag plate 15. Around the impression there is a clearance which has to be filled up with an auxiliary metal 17 which is run in or injected. The surface is then made flush to get rid of any excess metal and the mould is finished up by making use of a drag 18. When applying said metal by pulverisation, the mould elements are only brought to a moderate temperature by which their hardness is not impaired.

Fig. 5 shows a section of a shallow piece 19 to be submitted to mass production in accordance with the present invention.

Fig. 6 shows an arrangement for obtaining said shallow piece 19 which serves to obtain the impression of the movable half die. The low-relief impression having already been obtained as stated above, a plastic sheet of suitable thickness is flanged on a block 20, for instance by means of a special rubber block. The thickness is controlled and piece 19 is made flush with 20 though leaving a slight overlapping of 19.

Fig. 7 shows a process for obtaining a pattern 21 of the punch. Piece 19 once inserted into 20 is retained by the standard plate 4 previously used. Said plate is provided with a hole leading to the inner edge of piece 19 with the object of securing firmly the plate's position. Such outfit duly insulated is used to obtain the impression 21 of the punch by coating a layer of special metal. Once the coating has reached a given thickness, any remaining clearance is filled up as already explained. The surface is then made flush by taking off any excess metal; the standard plate is then used for supporting the punch, a re-inforced counter plate being provided for.

Fig. 8 shows an alternative embodiment to Fig. 7. The mould is seen already assembled for finishing the punch. In order to fill up the cavity 22 (Fig. 7) through injecting the least possible quantity of metal, a piece 24 has been provided so as to leave the desired clearance for the metal 13 to be injected through 12. The punch is supported by piece 23. Piece 24 may be dispensed with and replaced by a notch made in piece 23.

The above described process may be further simplified. Figs. 9 to 22 refer to such simplifications in the case, taken as an example, of manufacturing buttons for clothing.

In order to render the object of the invention quite clear, the case of mass production of buttons for clothing has been chosen as an example. Such buttons are plain or with fancy designs; each must, moreover, be manufactured in various sizes. Under such conditions, should one have to establish a complete mould with multiple impressions for each model and size of buttons, the expenditure required would be hard to write off.

For said reasons, an outfit has been devised by which the pattern supporting bands are removable and interchangeable; such bands will thus only require a minimum quantity of metal, being formed so as to be easily secured into the supporting blocks, which latter form a joint mass with the flanges of the press.

In consequence, such supporting blocks have to be provided with some securing and guidance system as well as with a drawing-in and a drawing-out arrangement, inasmuch the mould should require it.

It should be well understood that no case is made in favor of any particular device in the execution of the different embodiments of the invention. A round shape for securing the fitting-in of the flanged bands into the supporting blocks is proposed with the sole object to allow the use of a lathe, which furnishes the best possible yield. In the drawings, the removable pieces will thus be inserted into the blocks by means of impressions of same gauge.

With such improvements, one has the advantage of needing only a single pattern for obtaining a mould with multiple impressions.

Figure 9:
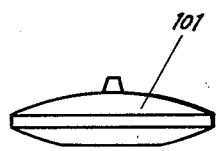
Figs. 9 and 10 show a piece to be submitted to repetition castings using an alternative embodiment of the process.
Figure 10:
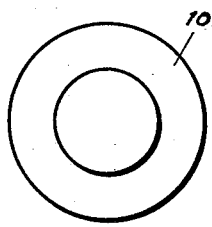

Figs. 9 and 10 show two aspects of a button 101 having to be manufactured in mass production based on the present invention, the face side of button 101 receiving possibly an artistic fancy decoration.

Figure 11:
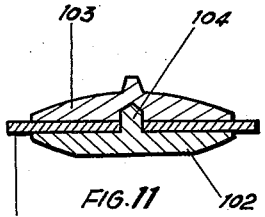
Figs. 11, 12, 13, 14 and 15 show the method for obtaining the half-patterns from which the impressions will be made.

Fig. 11 shows how to proceed for obtaining the prototype impression to be submitted to mass production, which is done by using a simplified mould: the button 101 has been worked out in two parts 102 and 103; the half 102 is provided with a tenon 104 protruding so as to fit into the center of the other half 103, the standard plate being seen at 105.

Figure 12:
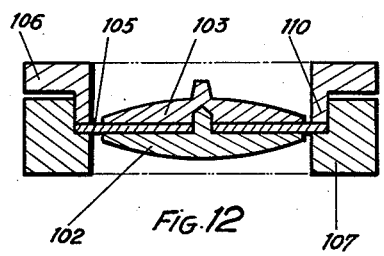

Fig. 12 shows a simplified mould before it is submitted to metallization; 106 shows the flanged plate which will form the piston, 107 the flanged plate which will form the impression, 110 the compression recess used for centering the standard plate 105, which supports the half-patterns 102 and 103. These half-patterns may already have been coated with a layer of a special metal, although this is not essential.

Figure 13:
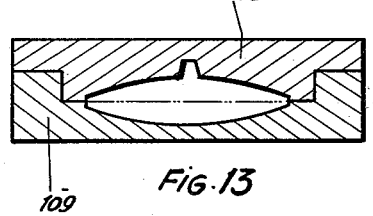

Fig. 13 shows aforesaid mould in its finished state after piece 105 has been taken off as well as pieces 102 and 103; 108 shows the piston and 109 the impression.

Figure 14:

Fig. 14 shows a piston 111 to be used in connection with the impression 109 with the object of obtaining the tenon 104 of piece 102.

Figure 15:
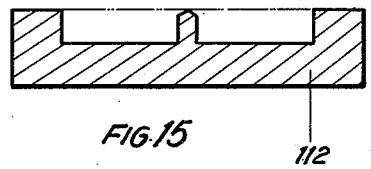

Fig. 15 shows impression 112 which has to act in connection with piston 108 so as to obtain the holed piece 103. Pieces 102 and 103 are further put in true alignment with accuracy.

Figure 16:
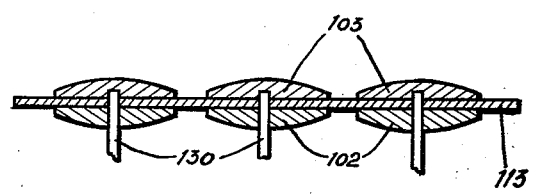
Fig. 16 is a cut through a standard plate.

Fig. 16 is a longitudinal section of a standard plate 113. The two half-patterns are placed on either side of the plate. The way for obtaining impressions from such a set-out has already been described with reference to Figs. 1 to 8. Core rods 130 are provided which, once the metal has been poured in, will be duly drilled so as to give access to the drawing-out rods.

Fig. 17 is a section of a compression mould, provided with a multiplicity of impressions and with a single piston; 114 is the block supporting the piston and 115 the block supporting the impression. It will be seen that the piston 117 and the impression 118 are very accurately centered within their respective blocks by means of an impression.

When applying the metallic coating required to form the impressions or to secure them into their right position, a compression recess is utilized to adjust the standard plate 113 of Fig. 16. By securing screws 120 and pins 121, it is possible to obtain a supercentering.

With such additional centering, the usual guidance pieces are only used for the first approach, being hereafter superseded by guidance pieces 121 which act only at the moment of closing down the outfit; the latter have less work to perform leaving the removable flanges undisturbed in spite of these being constantly shifted in and out.

An alternative embodiment is to secure on the standard plate impressions or punches which have been obtained by forcing a punch to enter a metallic block under very high pressures; the impressions obtained by such method may be located either on one side or on both sides of the standard plate and secured as stated before.

Fig. 18 is a section of a mould with seven impressions which can be fed by suitable means. It will be noted that an adjusting device 122 has been provided for in a piston 123 which first facilitates a due centering of piece 113 (Fig. 16) and further gives an automatic additional centering in the act of closing the mould, due to close covering of an impression 124. Snugs which are not shown on the drawings reduce frictional effects. Holes for general alignment and consecutive securing are seen at 125 and join 123 and 124 by means of pins. 123 show the holes managed for introducing drawing-off rods, which holes were formed by drilling the cores 130 (Fig. 16).

Fig. 19 is a partial section referring to Fig. 18 showing the way of guidance according to the present invention. The piston supporting block is shown at 114 and the impression supporting block is shown at 115, 127 being one of the pins by means of which the piston 123 can be reached, 124 representing the impression, 122 the super-guidance and 128 one of the wedges which support and guide plates 129, the latter being part of the drawing-clear device which is not shown on the drawing.

Fig. 20 is a partial plan view referring to Figs. 18 and 19, in which 115 is the block supporting the impressions, 127 one of the guidance pieces used for reaching the mould, 122 the plate supporting the impression 131, finally 120 and 121 the holes for alignment and securing.

Fig. 21 shows an alternative embodiment by which the supporting blocks 132 and 133 are covered with flanged plates 134 and 135 which are guided and held in position by means of interlocked guides 136; 137 shows a cylindrical fitting, although the plates may be made rectangular or square.

Fig. 22 shows a partial view of a ram mould with a multiplicity of impressions and a single piston. Flanged plates 142 and 143 may be formed square or rectangular and adjusted by means of guides 136 in relation to blocks 132 and 133; a compression recess is shown at 139 provided as required by the pieces, 141 showing the superadjustment pins.

It is also possible to provide for an outfit by which half-patterns are assembled and provided with individual standard reference plates so as to render said half-patterns independent from each other and separately removable without whatever interference with the position of other half-patterns.

Such outfit is described with reference to Figs. 23 to 30, which are relating to a round piece of simple form, part of which is burrowed, said part leading to a mould which is thus showing a high-relief in respect to the drawing-clear plan of the piece.

A special simple device for axial centering is also foreseen as well as a system for fixing the position of the flanged block on the supporting blocks.

Fig. 23 is a partial section of a mould formed in accordance with said embodiment: the removable flanged blocks are shown at 201 and 202, an upper supporting block is seen at 203, a lower block at 204, the guidance system for reaching the mould at 205 and a super-guidance device at 206; 207 and 207 show the fixing screws of the flanged plates on their supporting blocks, 208 is one of the stakes, 208 a standard runner acting on a plate 210 which supports the drawing-out rods.

Figure 29:
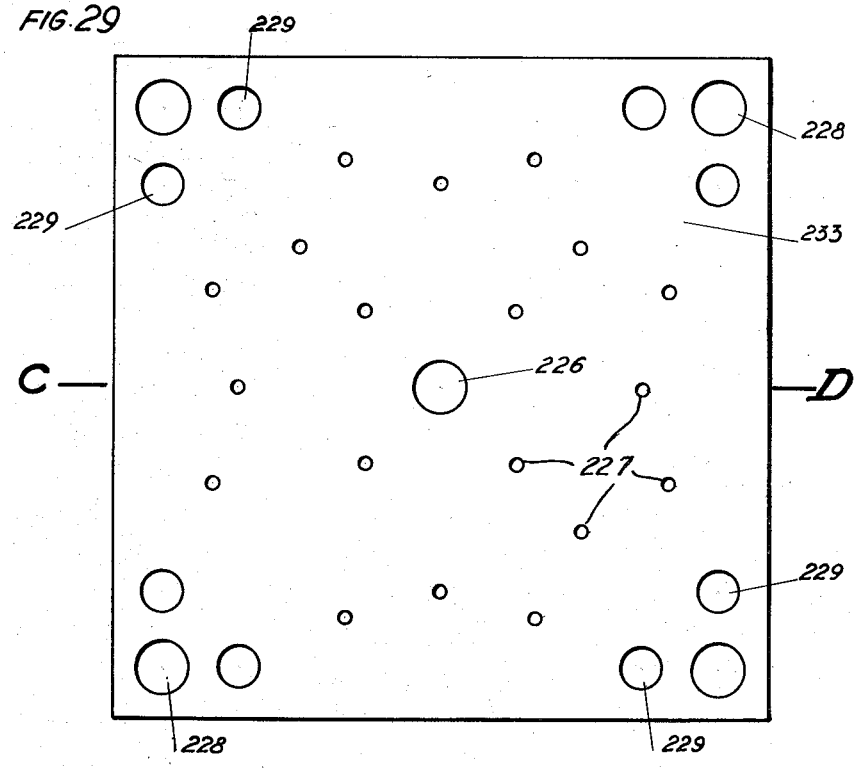
Fig. 29 is a plan view of a standard plate.

Fig. 24 is a vertical section along line C—D of Fig. 29, passing through the axial part of a mould with four impressions. Although only two drawing-out rods appear on the drawings, the supporting block 204 is provided with gauge holes—for example, twenty in number—so as to use flanged plates with 4, 8 or 12 impressions. A centering of flanged plates 201 and 202 is secured by means of a simple and accurate device, making use of piece 212 and 213 set into their respective holes which have been obtained by drilling into the flanged plates 201 and 202. The flanged plates are aligned and guided by means of the axis 206; screws 207 maintain them in their position in the supporting blocks; 214 shows the central drawing-clear device and 215—215 two of the four impressions; the metal is injected through 216, stakes 208 are guiding the standard plates 210 when acting on the plate 209 which supports drawing-out rods 211—211.

Fig. 25 is a section of a revolving piece 217 having to be moulded simultaneously by means of 4, 8 or 12 pieces, according to their dimensions, using for this sake a same supporting block and removable flanged plates with 4, 8 or 12 impressions. It will be noted that the drawing-out plan passes along line A—B, so that part of the mould is forming a high relief over the drawing-off plan.

Fig. 26 shows a half-pattern 218 exactly similar to the other half 219 which appears below line A—B in Fig. 25. A small flange is located at 220, the object of which is to secure the half-pattern in the drawing-off plan of the removable flanged plate; a cavity is shown at 221, which may be cylindrical or otherwise, to facilitate the assembly of the whole outfit.

Fig. 27 is a section through the second part 222 of the pattern. The flange shown at 223 has a tenon 224 fitting into the recess 221 (Fig. 26) so that the two parts, when assembled, reproduce exactly the piece 217, though showing on the outside a median part acting as a standard plate. The outside part has to be secured between the two holed flanged plates before coating with the metal used for forming and fixing the impressions. 225 shows a protruding piece the object of which is to adjust the pattern in its right position in respect to the supporting block 204.

Fig. 29 is a plan view of a standard plate 233 used for the manufacture of supporting blocks and interchangeable flanged plates. 226 shows an axial gauged hole and at a definite distance from the latter are holes 227 permitting the passage of drawing-out rods corresponding respectively to 4, 8 or 12 impressions; 223 shows the holes for the guide 206 and 229 the holes for the securing screws 207.

Figure 30:
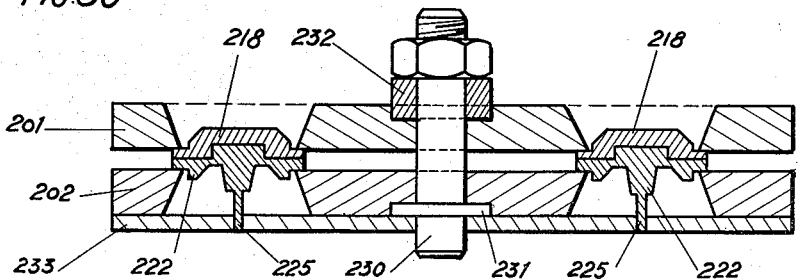

Fig. 30 shows the flanged plates 201 and 202 ready for obtaining impressions as described in case the process is applied in accordance with Figs. 1 to 8. The case chosen is that of a simultaneous moulding of four pieces 217 (Fig. 25). The half-patterns are located in their true position by means of their central parts 221 and 224 (Figs. 26 and 27) and are held within the drawing-out plan by means of the small flanges 220 and 223. A gauged assembling axis is shown at 230. A flange 231 on said axle and a piece 232 taking the place of pieces 212 and 213 of Fig. 24 allow to have the flanged plates 101 and 102 adjusted to the same center. On the other hand, the guidance holes 228 drilled with the aid of the plate 233 (Fig. 29) are holding the guides 206 (Fig. 23) and adjust the two pieces accurately; the flanged plates being in their proper alignment, bolts 234 (Fig. 28) are made use of and passed through the holes 229 so as to screw tight the whole outfit.

Previously, the outfit has been placed on the plate 233 with the protruding pieces 225 fitted into their respective holes; once the bolts 234 have been screwed down and the plate 233 is withdrawn, one may be certain that after having obtained the impressions, a drilling of the protruding rods to the right gauge will allow the passage of the drawing-out rods in their true position and in exact correspondence with the holes of the supporting block 204.

Different modifications may be brought in the means for carrying out the invention while remaining within the scope of the invention.

What I claim is:

1. A method of making high precision moulds for use in injection moulding procedures which consists in applying a protective coat of insulating material to selected portions of opposite faces of a pattern plate, assembling pattern sections on opposite sides of the plate on areas not covered by insulation but adjacent thereto, forming mould elements for the article to be formed over the pattern sections with their edge portions resting on the insulation, removing the protective insulating coat and the mould elements from the pattern plate replacing the mould elements on the pattern sections, inserting the pattern plate carrying the mould elements between cope and drag members of a flask, said members each having cavities with feed openings, securing the pattern plate carrying the mould elements and the cope and drag members in accurate registry, injecting fused metal under pressure into said feed openings, and subsequently dismantling the flask to remove the pattern plate and the mould elements.

2. A method of making high precision moulds for use in injection moulding procedures which consists in applying a protective coat of insulating material to the opposite faces of grooves in a pattern plate, assembling pattern sections to an uncoated area of said plate within said grooves, forming mould elements by applying a metallic coating to the outer surfaces of said pattern sections with the edges of said mould elements resting on said coating, removing the protective insulating coating from the pattern plate, inserting the pattern plate carrying the mould elements between cope and drag members of a flask, said members having cavities with feed openings, securing the plate carrying the mould sections and the cope and drag members in accurate registry, injecting fused metal under pressure into said feed openings, and subsequently dismantling the flask to remove the pattern plate.

References Cited in the file of this patent

UNITED STATES PATENTS

| | | |
|---|---|---|
| 630,771 | Blackwell | Aug. 8, 1899 |
| 966,558 | Johness | Aug. 9, 1910 |
| 1,649,312 | Laukel | Nov. 15, 1927 |
| 1,810,523 | Laukel | June 16, 1931 |
| 1,912,889 | Couse | June 6, 1933 |
| 2,303,092 | Raphael | Nov. 24, 1942 |
| 2,399,373 | Miller | Apr. 30, 1946 |

FOREIGN PATENTS

| | | |
|---|---|---|
| 255 | Great Britain | Feb. 1, 1854 |

OTHER REFERENCES

Modern Plastics, vol. 30, issue 1, pages 105–109, 112, 114, 116, September 1952.